(12) United States Patent
Hirano (10) Patent No.: US 11,862,918 B2
(45) Date of Patent: Jan. 2, 2024

(54) ELECTRIC WIRE JOINING STRUCTURE, ELECTRIC WIRE JOINING METHOD, AND TERMINAL

(71) Applicant: TATSUTA ELECTRIC WIRE & CABLE CO., LTD., Higashiosaka (JP)

(72) Inventor: Masaki Hirano, Kyoto (JP)

(73) Assignee: TATSUTA ELECTRIC WIRE & CABLE CO., LTD., Osaka (JP)

( * ) Notice: Subject to any disclaimer, the term of this patent is extended or adjusted under 35 U.S.C. 154(b) by 251 days.

(21) Appl. No.: 16/754,863

(22) PCT Filed: May 11, 2018

(86) PCT No.: PCT/JP2018/018331
§ 371 (c)(1),
(2) Date: Apr. 9, 2020

(87) PCT Pub. No.: WO2019/082425
PCT Pub. Date: May 2, 2019

(65) Prior Publication Data
US 2021/0203088 A1 Jul. 1, 2021

(30) Foreign Application Priority Data
Oct. 24, 2017 (JP) .................. 2017-205433

(51) Int. Cl.
*H01R 4/58* (2006.01)
*H01R 11/12* (2006.01)
(Continued)

(52) U.S. Cl.
CPC ............... *H01R 4/58* (2013.01); *H01R 11/12* (2013.01); *H01R 43/00* (2013.01); *C23C 4/12* (2013.01); *C23C 24/04* (2013.01)

(58) Field of Classification Search
CPC ........ H01R 4/023; H01R 9/2416; H01R 4/18; H01R 4/58; H01R 4/62
See application file for complete search history.

(56) References Cited

U.S. PATENT DOCUMENTS 4,312,793 A * 1/1982 Charneski ............... H01R 3/08
252/519.31
9,124,083 B2 * 9/2015 Aase ....................... B29C 43/18
(Continued)

FOREIGN PATENT DOCUMENTS

CN  2764011 Y  3/2006
CN  1918757 A  2/2007
(Continued)

OTHER PUBLICATIONS

Japanese Office Action and English translation thereof dated Jun. 18, 2019.
(Continued)

*Primary Examiner* — Chau N Nguyen
(74) *Attorney, Agent, or Firm* — Harness, Dickey & Pierce, P.L.C.

(57) ABSTRACT

The present invention provides an electric wire joining structure (80), an electric wire joining method, and a terminal (1), each of which allows a reduction in burden on an operator. The present invention includes: one or more electric wires (10); a terminal (1) including one or more insertion holes (7) for the respective one or more electric wires (10), the one or more electric wires (10) being inserted into the respective insertion holes (7); and a joining part (20) formed by thermal spraying, the joining part (20) joining the one or more electric wires (10) to the terminal (1) on a side on which the one or more electric wires (10) have passed through the respective one or more insertion holes (7).

7 Claims, 5 Drawing Sheets (51) Int. Cl.
*H01R 43/00* (2006.01)
*C23C 4/12* (2016.01)
*C23C 24/04* (2006.01)

(56) References Cited

U.S. PATENT DOCUMENTS

| | | | |
|---|---|---|---|
| 9,225,096 B2* | 12/2015 | Crofoot | H01R 13/405 |
| 10,276,963 B2* | 4/2019 | Powell | H01R 13/26 |
| 2007/0202716 A1 | 8/2007 | Fazakas | |
| 2015/0249294 A1 | 9/2015 | Iio et al. | |
| 2017/0054225 A1* | 2/2017 | Suzuki | H01R 4/021 |
| 2019/0067859 A1* | 2/2019 | Sugiura | H01R 13/2421 |

FOREIGN PATENT DOCUMENTS

| | | |
|---|---|---|
| CN | 102714095 A | 10/2012 |
| DE | 102008003616 A1 | 7/2009 |
| EP | 2518743 A1 | 10/2012 |
| JP | 04-297643 | 10/1992 |
| JP | 2005-129498 | 5/2005 |
| JP | 2008/011677 A | 1/2008 |
| JP | 2013-030338 | 2/2013 |
| WO | WO-2014/105585 A1 | 7/2014 |

OTHER PUBLICATIONS

International Preliminary Report on Patentability dated May 7, 2020.
International Search Report dated Jul. 17, 2018.
Extended European Search Report dated Jun. 23, 2021.
Chinese Office Action and English translation thereof dated Mar. 3, 2021.

* cited by examiner

ELECTRIC WIRE JOINING STRUCTURE, ELECTRIC WIRE JOINING METHOD, AND TERMINAL

TECHNICAL FIELD

The present invention relates to an electric wire joining structure, an electric wire joining method, and a terminal.

BACKGROUND ART

Caulking has been widely known as a technique for joining an electric wire and a terminal.

SUMMARY OF INVENTION

Technical Problem

However, caulking needs to be performed manually, one joint at a time. Accordingly, a burden on an operator increases as the number of electric wires to be joined increases.

The present invention is accomplished in view of the above problem. An object of the present invention is to provide an electric wire joining structure, an electric wire joining method, and a terminal, each of which enables reducing a burden on an operator.

Solution to Problem

In order to attain the object, an electric wire joining structure in accordance with the present invention is an electric wire joining structure, including: one or more electric wires; a terminal including one or more insertion holes for the respective one or more electric wires, the one or more electric wires being inserted into the respective insertion holes; and a joining part formed by thermal spraying, the joining part joining the one or more electric wires to the terminal on a side on which the one or more electric wires have passed through the respective one or more insertion holes.

Caulking has been widely known as a technique for joining an electric wire and a terminal. Caulking requires manual operation. As such, in a case where caulking is adopted, a burden on an operator increases as the number of electric wires to be joined increases.

In contrast, with the above configuration, the one or more electric wires are joined to the terminal by the joining part as a result of thermal spraying. Thermal spraying may be carried out with use of a conventional thermal spraying device. This allows a reduction in burden on an operator. This effect is exhibited to a greater extent as the number of electric wires to be joined increases.

In order to attain the object, an electric wire joining method in accordance with the present invention is an electric wire joining method, including the steps of: (a) inserting, into one or more insertion holes formed in a terminal, respective one or more electric wires; and (b) joining, by thermal spraying, the one or more electric wires to the terminal on a side on which the one or more electric wires have passed through the respective one or more insertion holes.

With the above configuration, an effect similar to that of the electric wire joining structure is brought about.

In order to attain the object, a terminal in accordance with the present invention is a terminal to be joined to one or more electric wires, including: a terminal main body having one or more insertion holes into which the respective one or more electric wires are to be inserted, the terminal main body including a tapered part, the one or more insertion holes being formed in the tapered part.

With the configuration, an effect similar to that of the electric wire joining structure is brought about by use of the terminal.

Advantageous Effects of Invention

The present invention enables providing an electric wire joining structure, an electric wire joining method, and a terminal, each of which allows a reduction in burden on an operator.

DESCRIPTION OF EMBODIMENTS

Embodiments are described below with reference to the drawings. In the following description, identical components and identical constituent elements are given respective identical reference signs. Such components and constituent elements are also identical in name and function. Thus, a specific description of those components and constituent elements is not repeated.

Terminal 1

Figure 1:
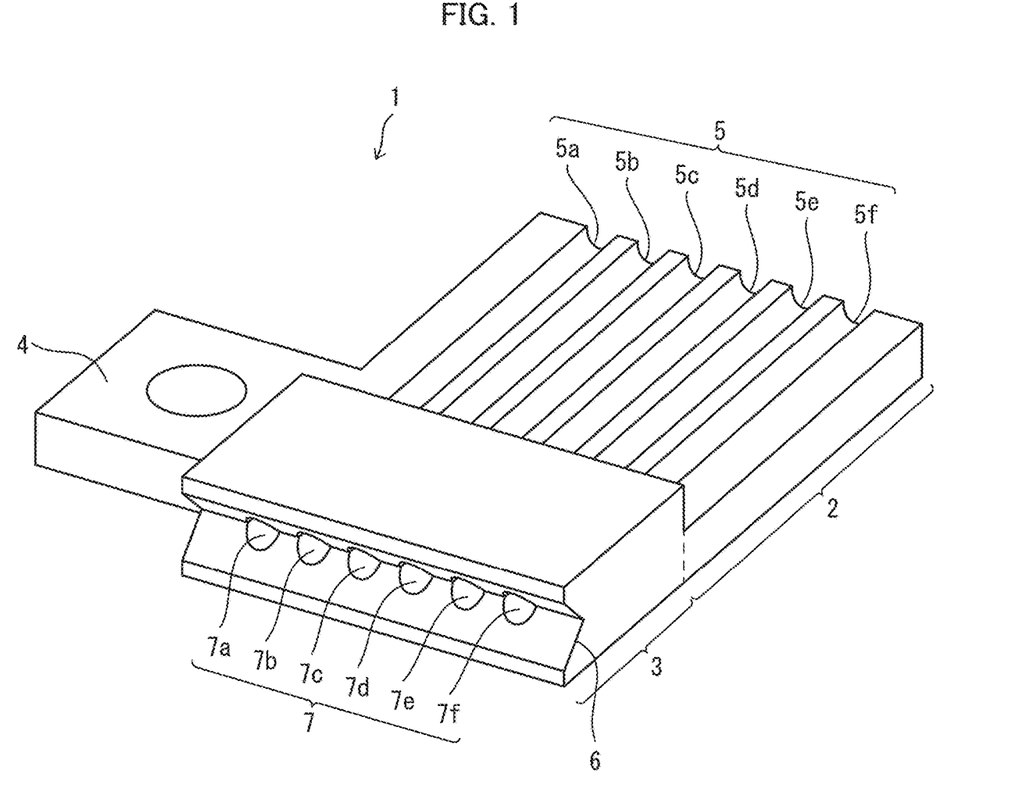
FIG. 1 is a perspective view of a terminal in accordance with an embodiment of the present invention.

FIG. 1 is a perspective view of a terminal 1 in accordance with an embodiment of the present invention. The terminal 1 includes an electric wire provision section 2, a terminal main body 3, and an external electric wire attachment section 4.

On an upper part of the electric wire provision section 2, electric wires 10*a* through 10*f* (not illustrated) are to be provided. More specifically, the electric wire provision section 2 is a rectangular parallelepiped and has grooves 5*a* through 5*f* on a main surface side of the electric wire provision section 2. The electric wires 10*a* through 10*f* are respectively provided in the grooves 5a through 5f. This allows the electric wires 10a through 10f to be provided stably on the electric wire provision section 2.

The terminal main body 3 has a tapered part 6 and a plurality of insertion holes 7a through 7f. More specifically, the terminal main body 3 is a rectangular parallelepiped. The terminal main body 3 has a groove on its main surface side, and the groove has a linear taper shape and extends throughout a length of a main surface of the terminal main body 3. The groove is hereinafter referred to as a "tapered part 6". The tapered part 6 has one opening of each of the plurality of insertion holes 7a through 7f. Details of the tapered part 6 will be described with reference to FIG. 2.

The electric wires 10a through 10f are respectively inserted into the insertion holes 7a through 7f. Each size of the insertion holes 7a through 7f can be determined in accordance with a diameter of a corresponding one of the electric wires 10. The insertion holes 7a through 7f each have a diameter φ of, for example, 1.6 mm.

The external electric wire attachment section 4 is provided so that an external electric wire (not illustrated) is electrically connected to the terminal 1. The electric wire 10 is electrically connected to the external electric wire via the external electric wire attachment section 4.

The terminal 1 is not limited to the above configuration, and can be configured in various manners as described below. More specifically, the electric wire provision section 2, the terminal main body 3, and the external electric wire attachment section 4 can be formed integrally. In this case, the electric wire provision section 2, the terminal main body 3, and the external electric wire attachment section 4 can be integrally formed with use of, for example, a tinned copper material. The number of insertion holes provided at the tapered part 6 only needs to be one or more, and is not therefore limited to a specific number. The terminal 1 does not necessarily need to include the electric wire provision section 2. The electric wire provision section 2 does not necessarily need to have the grooves 5a through 5f on its main surface side. The external electric wire attachment section 4 can be provided at any position of the terminal 1. The electric wire provision section 2 and the terminal main body 3 are not limited to a rectangular parallelepiped shape, and can have other shapes. The electric wire 10 can be a covered wire or a bare wire.

Figure 2:
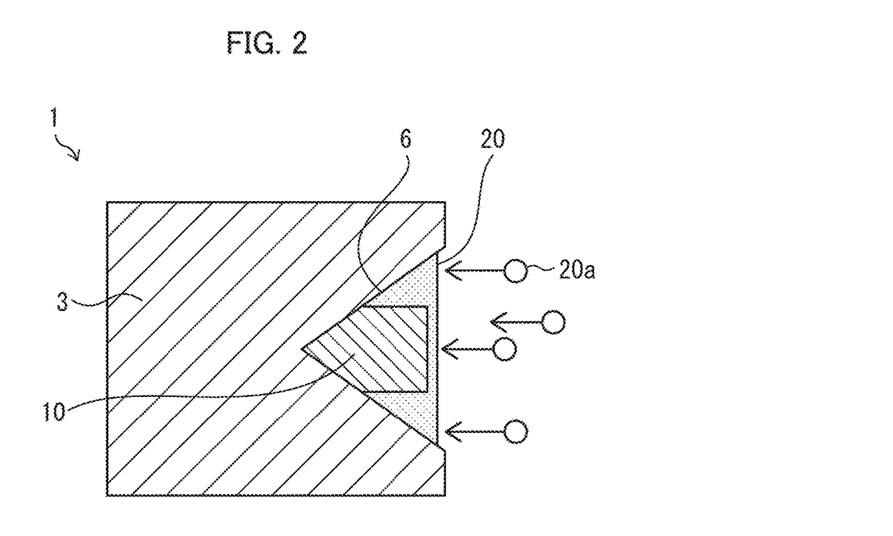
FIG. 2 is a cross-sectional view schematically illustrating how a terminal in accordance with an embodiment of the present invention and an electric wire inserted into the terminal are joined by thermal spraying.

The following description will discuss the tapered part 6, with reference to FIG. 2. FIG. 2 is a cross-sectional view schematically illustrating how the terminal 1 and the electric wire 10 inserted into the terminal 1 are joined by thermal spraying. The electric wire provision section 2 is located (though not illustrated) on a left side in FIG. 2, and the electric wire 10 passes through an insertion hole rightward in FIG. 2.

As described above, the terminal main body 3 has the tapered part 6. The tapered part 6 has a width which gradually increases in a direction in which the electric wire 10 passes through an insertion hole 7 (rightward in FIG. 2). A taper angle is set to 30°, 45°, or the like with respect to the direction in which the electric wire 10 passes through the insertion hole. Note, however, that the taper angle is not limited to a specific angle. It is preferable that a tip part of the electric wire 10 be flush with or substantially flush with the main surface of the terminal main body 3 which has the tapered part 6. Note, however, that the present embodiment is not limited to such a configuration.

As illustrated in FIG. 2, in a state where the electric wire 10 has passed through the insertion hole 7, a spray material 20a, which is electrically conducive, is sprayed onto the tapered part 6. The spray material 20a is accumulated, so that a film of the spray material 20a is formed. The film is hereinafter referred to as a "joining part 20". A thermal spray method employed in an embodiment of the present invention can be a well-known thermal spray method. The spray material can also be a well-known spray material.

With reference to FIG. 2, the following discusses a case in which (i) the electric wire 10 is a covered wire and (ii) a tip part of the electric wire 10 is flush with or substantially flush with the main surface of the terminal main body 3 which has the tapered part 6. The joining part 20 is secured in the tapered part 6, by the spray material 20a being sprayed onto the tapered part 6 in a state where the electric wire 10 has passed through the insertion hole 7. As illustrated in FIG. 2, the tip part, in which a conductor is exposed, of the electric wire 10 is embedded in the joining part 20. This allows the conductor of the electric wire 10 and the terminal main body 3 to be electrically connected to each other via the joining part 20.

Note that in a case where the electric wire 10 is a bare wire, the electric wire 10 is not covered. As such, a tip section of the electric wire 10 does not need to be embedded in the joining part 20 in order for a conductor of the electric wire 10 and the terminal main body 3 to be electrically connected to each other. Accordingly, in a case where the electric wire 10 is a bare wire, an amount of the spray material 20a, necessary in order to cause the electric wire 10 and the terminal 1 to be electrically connected to each other, is smaller than that in a case in which the electric wire 10 is a covered wire.

Figure 3:
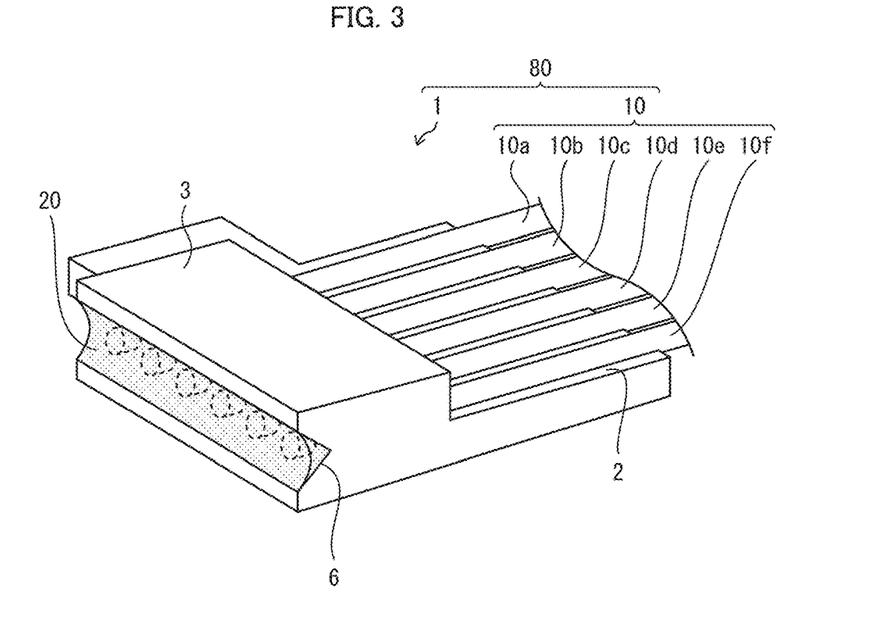
FIG. 3 is a perspective view of an electric wire joining structure in accordance with an embodiment of the present invention.

FIG. 3 is a perspective view of an electric wire joining structure 80 in accordance with an embodiment of the present invention. The electric wire joining structure 80 includes the terminal 1 and the electric wires 10a through 10f. The terminal 1 is joined to the electric wires 10a through 10f by thermal spraying. More specifically, the joining part 20 is located in the tapered part 6 of the terminal main body 3. The tip parts of the respective electric wires 10a through 10f are embedded inside the joining part 20. This allows the conductor, located in the tip part of each of the electric wires 10a through 10f, to be electrically connected to the terminal main body 3 via the joining part 20. Note that the electric wire joining structure 80 is described as including the plurality of electric wires 10a through 10f, but it is only necessary that the number of electric wires of the electric wire joining structure 80 be one or more.

The electric wire joining structure 80 can be used in a power device through which a large electric current flows. For example, the electric wire joining structure 80 can be used in an electric car, a hybrid car, inverter control, various general-purpose motors, or the like. This also applies to an electric wire joining structure 90 which will be described later.

Terminal 30

Figure 4:
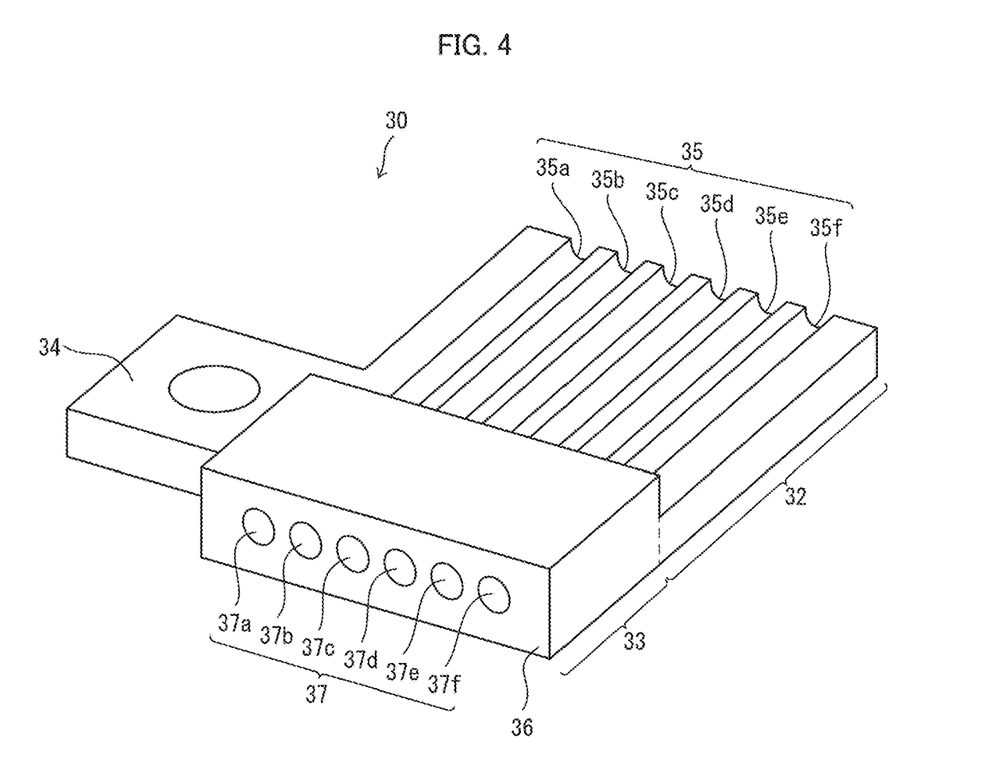
FIG. 4 is a perspective view of a terminal in accordance with another embodiment of the present invention.

With reference to FIG. 4, the following description will discuss a terminal 30 in accordance with another embodiment of the present invention. FIG. 4 is a perspective view of the terminal 30. The terminal 30 includes an electric wire provision section 32, a terminal main body 33, and an external electric wire attachment section 34. The electric wire provision section 32 can be the same as the electric wire provision section 2 of the terminal 1. The external electric wire attachment section 34 can be the same as the external electric wire attachment section 4 of the terminal 1. Accordingly, descriptions of the electric wire provision section 32 and the external electric wire attachment section 34 will be omitted in the following description.

The terminal main body 33 includes a plurality of insertion holes 37a through 37f. The terminal main body 33 is a rectangular parallelepiped. Unlike the terminal 1, the terminal main body 33 of the terminal 30 does not include a tapered part. The plurality of insertion holes 37a through 37f pass from a first main surface, which is in contact with the electric wire provision section 32, through to a second main surface, which is opposite to the first main surface.

The terminal 30 can be realized by the following various configurations as described below. More specifically, the electric wire provision section 32, the terminal main body 33, and the external electric wire attachment section 34 can be formed integrally. In this case, the electric wire provision section 32, the terminal main body 33, and the external electric wire attachment section 34 are integrally formed with use of, for example, a tinned copper material. The terminal 30 does not necessarily need to include the electric wire provision section 32. The electric wire provision section 32 does not necessarily need to include the grooves 35a through 35f on one main surface of the electric wire provision section 32. The external electric wire attachment section 34 can be provided at any place of the terminal 30. The electric wire provision section 32 and the terminal main body 33 are not limited to a rectangular parallelepiped shape, and can therefore have other shapes. The electric wire 10 can be a covered wire or a bare wire.

Figure 5:
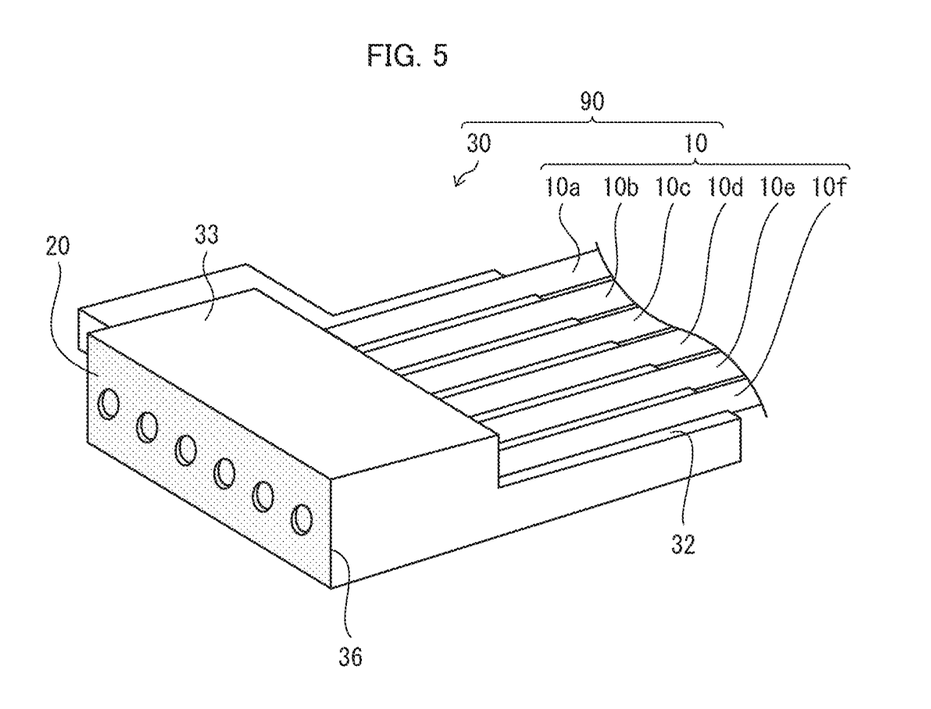
FIG. 5 is a perspective view of an electric wire joining structure in accordance with another embodiment of the present invention.

The following description discusses, with reference to FIG. 5, a method for joining the terminal 30 and the electric wire 10. FIG. 5 is a perspective view of the electric wire joining structure 90 in accordance with an embodiment of the present invention.

The electric wire joining structure 90 includes the terminal 30 and the electric wires 10a through 10f. The terminal 30 is joined to the electric wires 10a through 10f by thermal spraying. More specifically, the following discusses a case in which (i) the electric wire 10 is a covered wire and (ii) a tip part of the electric wire 10 is flush with or substantially flush with the second main surface. As illustrated in FIG. 5, the joining part 20 is provided on the second main surface of the terminal main body 3. The tip parts of the respective electric wires 10a through 10f are embedded inside the joining part 20. This allows the conductor in the tip part of each of the electric wires 10a through 10f to be electrically connected to the terminal main body 33 via the joining part 20. Note that although the electric wire joining structure 90 includes the electric wires 10a through 10f in the above description, it is only necessary that the number of electric wires of the electric wire joining structure 90 be one or more.

Terminal 40 and terminal 50

Figure 6:
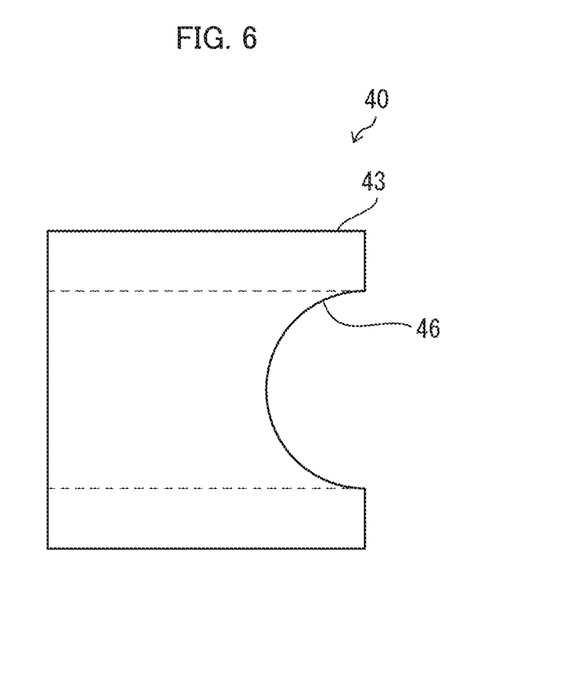
FIG. 6 is a cross-sectional view schematically illustrating a terminal main body in accordance with a terminal in accordance with still another embodiment of the present invention.
Figure 7:
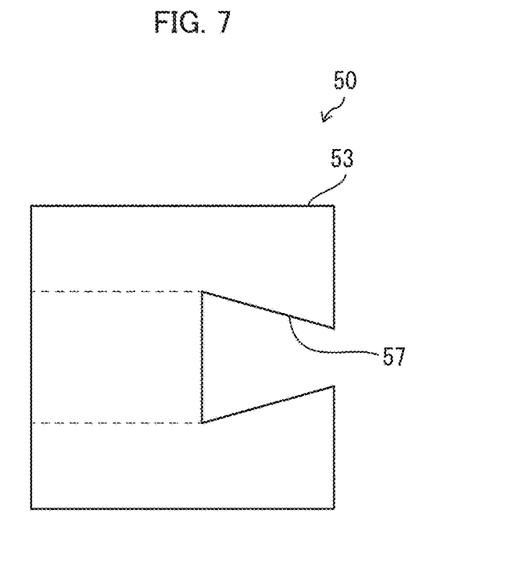
FIG. 7 is a cross-sectional view schematically illustrating a terminal main body in accordance with a terminal in accordance with still another embodiment of the present invention.

With reference to FIG. 6, the following description will discuss a terminal main body 43 of a terminal 40 in accordance with still another embodiment of the present invention. FIG. 6 is a cross-sectional view schematically illustrating the terminal main body 43. The following description will also discuss, with reference to FIG. 7, a terminal main body 53 of a terminal 50 in accordance with still another embodiment of the present invention. FIG. 7 is a cross-sectional view schematically illustrating the terminal main body 53.

In general, the term "taper/tapered" means becoming gradually enlarged in diameter from the bottom up. Types of "taper" encompass linear taper, exponential taper, parabolic taper, inverse taper, and the like.

The terminal main body 43 illustrated in FIG. 6 includes a tapered part 46 having a circular shape. The terminal main body 53 illustrated in FIG. 7 includes a tapered part 57 having an inverse taper shape. A tapered part can thus have various shapes. Further, a tapered part of an embodiment of the present invention is not limited to a configuration in which opposite surfaces of a taper shape of the tapered part are inclined symmetrically. Alternatively, such a tapered part can be configured so that the opposite surfaces are inclined asymmetrically.

Formation of Joining Part 20 by Cold Spraying

Among well-known thermal spray methods, for example, the following methods are known: warm spraying, aerosol deposition, free jet PVD, flame spraying, wire flame spraying, powder flame spraying, wire/rod flam spraying, high velocity flame spraying, detonation spraying, electrical spraying, arc spraying, plasma spraying, wire explosion spraying, and cold spraying. The following description will discuss, as an example, a method of forming the joining part 20 by use of the cold spraying.

In recent years, a film forming method, that is called "cold spraying," has been used. The cold spraying is a method for (i) causing a carrier gas, whose temperature is lower than a melting point or a softening temperature of a film material, to flow at a high speed, (ii) introducing the film material into the flow of the carrier gas so as to increase the speed of the carrier gas into which the film material has been introduced, and (iii) causing the film material to collide with, for example, a base material at a high speed while the film material is in a solid phase so as to form a film.

A principle of film formation by use of the cold spraying is understood as below.

A collision speed of not less than a certain critical value is required for a film material to adhere to and accumulate on a base material so as to form a film on the film material. Such a collision speed is hereinafter referred to as a critical speed. In a case where the film material collides with the base material at a speed that is lower than the critical speed, the base material is worn, so that small crater-shaped cavities are merely formed in the substrate. The critical speed is changed in accordance with, for example, a material, a size, a shape, a temperature, and/or an oxygen content of the film material, or a material of the base material.

In a case where the film material collides with the base material at a speed that is not less than the critical speed, plastic deformation caused by a great shearing force occurs near an interface between the film material and the base material (or the film which has already been formed). The plastic deformation and generation of a great shock wave in a solid due to the collision cause an increase in temperature near the interface, and in this process, solid phase bonding occurs (i) between the film material and the base material and (ii) between the film material and the film (or the film material which has already adhered to the base material).

Cold Spray Device 100

Figure 8:
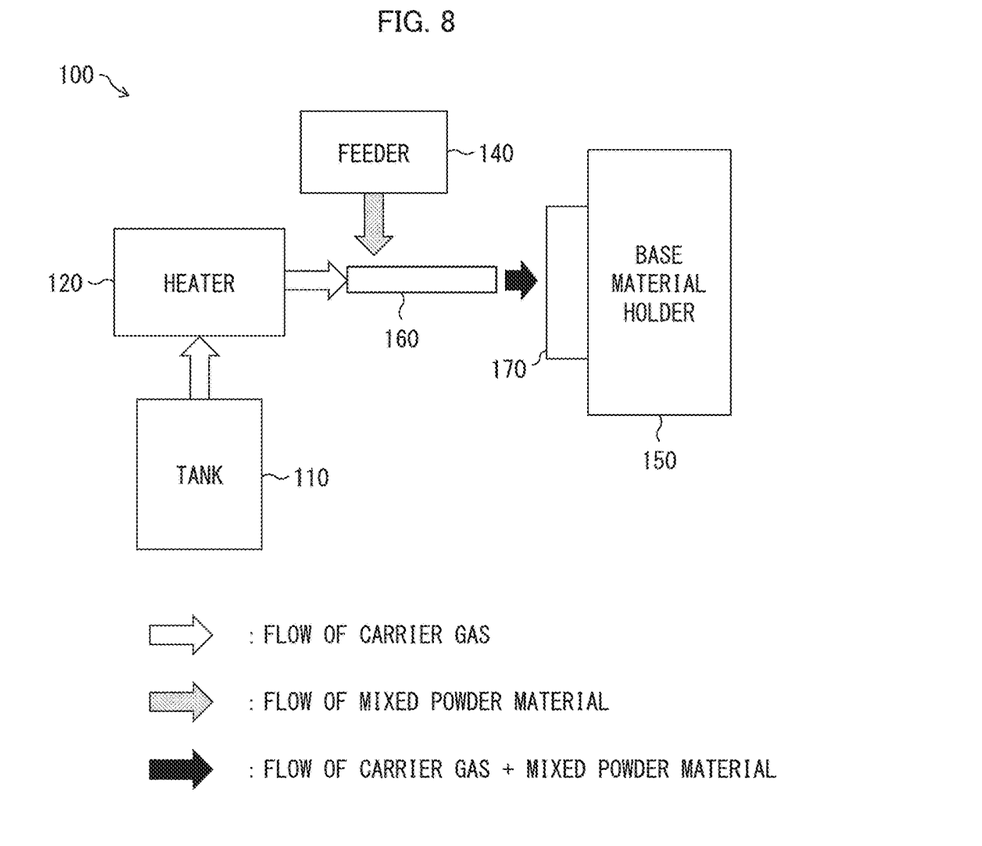
FIG. 8 is a view schematically illustrating a cold spray device in accordance with an embodiment of the present invention.

FIG. 8 is a view schematically illustrating a cold spray device 100. As illustrated in FIG. 8, the cold spray device 100 includes a tank 110, a heater 120, a spray nozzle 160, a feeder 140, a base material holder 150, and a control device (not illustrated).

The tank 110 stores therein a carrier gas. The carrier gas is supplied from the tank 110 to the heater 120. Examples of the carrier gas include nitrogen, helium, air, and a mixed gas of nitrogen, helium, and air. A pressure of the carrier gas is adjusted so that the pressure of the carrier gas at the exit of the tank 110 is, for example, not less than 70 PSI and not more than 150 PSI (not less than approximately 0.48 Mpa and not more than approximately 1.03 Mpa). Note, however, that the pressure of the carrier gas at the exit of the tank 110 does not necessarily need to fall within the above range, and such pressure is appropriately adjusted in accordance with, for example, material(s) and/or a size of a film material, or material(s) of a base material.

The heater 120 heats the carrier gas which has been supplied from the tank 110. More specifically, the carrier gas is heated to a temperature that is lower than a melting point of the film material which is supplied from the feeder 140 to the spray nozzle 160. For example, the carrier gas is heated so that the temperature of the carrier gas at an exit of the heater 120 falls within the range of not less than 50° C. and not more than 500° C. Note, however, that a heating temperature of the carrier gas at the exit of the heater 120 does not necessarily need to fall within the above range, and is appropriately adjusted in accordance with, for example, the material(s) and/or the size of the film material, or the material(s) of the base material.

The carrier gas is heated by the heater 120 and is then supplied to the spray nozzle 160.

The spray nozzle 160 (i) accelerates a speed of the carrier gas, which has been heated by the heater 120, so that the speed falls within the range of not less than 300 m/s and not more than 1200 m/s, and then (ii) sprays the carrier gas therethrough onto a base material 170 (the terminal main body 3 or the terminal main body 33). Note, however, that the speed of the carrier gas does not necessarily need to fall within the above range, and is appropriately adjusted in accordance with, for example, the material(s) and/or the size of the film material, or the material(s) of the base material.

The feeder 140 supplies the film material to the flow of the carrier gas whose speed is accelerated by the spray nozzle 160. The film material which is supplied from the feeder 140 has a particle size of, for example, not less than 1 µm and not more than 50 µm. Together with the carrier gas, the film material which has been supplied from the feeder 140 is sprayed through the spray nozzle 160 onto the base material 170.

The base material holder 150 fixes the base material 170. Onto the base material 170 which has been fixed by the base material holder 150, the carrier gas and the film material are sprayed, through the spray nozzle 160. A distance between a surface of the base material 170 and a tip of the spray nozzle 160 is adjusted so that the distance falls within the range of, for example, not less than 1 mm and not more than 30 mm. In a case where the distance between the surface of the base material 170 and the tip of the spray nozzle 160 is less than 1 mm, a spraying speed at which the film material is sprayed is decreased. This is because the carrier gas, sprayed from the spray nozzle 160, flows back into the spray nozzle 160. During the flowing back, a pressure, generated when the carrier gas flows back, can cause a member (e.g., a hose) connected to the spray nozzle 160 to be detached from the spray nozzle 160. Note, however, that in a case where the distance between the surface of the base material 170 and the tip of the spray nozzle 160 is more than 30 mm, efficiency in film formation is decreased. This is because it becomes more difficult for the carrier gas and the film material, which have been sprayed from the spray nozzle 160, to reach the base material 170.

Note, however, that the distance between the surface of the base material 170 and the tip of the spray nozzle 160 does not necessarily need to fall within the above range, and is therefore appropriately adjusted in accordance with, for example, the material(s) and/or the size of the film material, or the material(s) of the base material.

The control device controls the cold spray device 100 in accordance with information stored therein in advance and/or an input by an operator. More specifically, the control device controls, for example, (i) the pressure of the carrier gas which is supplied from the tank 110 to the heater 120, (ii) the temperature of the carrier gas which is heated by the heater 120, (iii) a kind and an amount of the film material which is supplied from the feeder 140, and (iv) the distance between the surface of the base material 170 and the spray nozzle 160.

In an embodiment of the present invention, the film material is sprayed onto the base material 170 by use of the cold spraying. The cold spray device 100 may use a well-known spray material in order to perform the cold spraying. For example, a mixed material of tin powder and zinc powder can be used as a spray material.

With use of the cold spray device 100 in this manner, a joining part 20, which joins an electric wire and a terminal, can be provided on a side on which the electric wire has passed through an insertion hole.

Note that the use of the cold spray device 100 allows enjoying advantages of cold spraying. The cold spraying brings about, for example, the following advantages: (1) prevention of oxidization of a film, (2) prevention of a change in quality of a film by heat, (3) formation of a dense film, (4) prevention of generation of fumes, (5) minimum masking, (6) film formation achieved by a simple device, and (7) formation of a thick metal film achieved in a short period of time.

Electric Wire Joining Method

Figure 9:
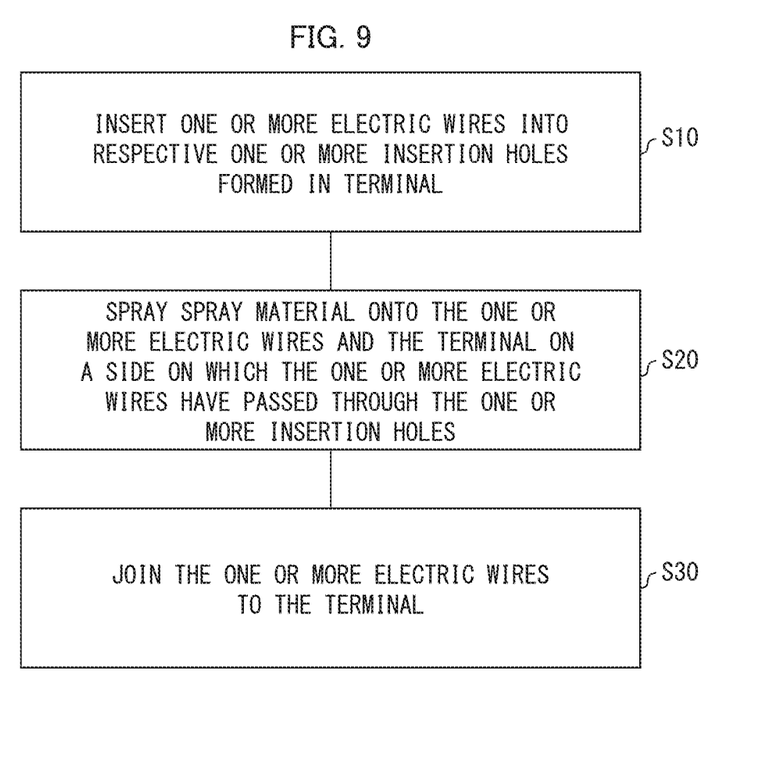
FIG. 9 is a flowchart of an electric wire joining method in accordance with an embodiment of the present invention.

The following description will discuss an electric wire joining method, with reference to FIGS. 1 and 9. FIG. 9 is a flowchart of an electric wire joining method in accordance with an embodiment of the present invention.

First, the electric wires 10a through 10f are inserted into the insertion holes 7a through 7f formed in the terminal 1 (S10). Subsequently, a spray material is sprayed onto the terminal 1 (more specifically, the tapered section 6 of the terminal main body 3) and the electric wires 10a through 10f, on the side on which the electric wires 10a through 10f have passed through the respective insertion holes 7a through 7f (S20). Then, the electric wires 10a through 10f are joined to the terminal 1 (more specifically, onto the tapered section 6 of the terminal main body 3) (S30). The electric wire joining structure 80 is obtained by S10 through S30 thus proceeded with. Similarly, the electric wire joining structure 90 is obtained by S10 through S30 being proceeded with.

Tapered Part

The following description will discuss effects which are brought about by the terminal 1 including the tapered part 6.

As described above, the terminal main body 3 of the terminal 1 includes the tapered part 6 having a linear shape. The structure of the terminal main body 3 is hereinafter referred to as a "V-shaped structure". In contrast, the terminal main body 33 of the terminal 30 does not have any tapered part. The structure of the terminal main body 33 is hereinafter referred to as a "flat structure". The following description will discuss comparison between the V-shaped structure and the flat structure, in terms of (1) amount of a spray material adhering and (2) tensile strength of an electric wire.

A spray material was sprayed, in a certain amount, onto the terminal main body 3 having the V-shaped structure (cone angle: 45°). The spray material was also sprayed, in the above certain amount, onto the terminal main body 33 having the flat structure. Then, a comparison was made between the V-shaped structure and the flat structure in terms of both (1) amount of the spray material adhering and (2) tensile strength of an electric wire.

(1) Amount of Spray Material Adhering

According to the comparison between the V-shaped structure and the flat structure, the V-shaped structure had approximately 1.7 times more spray material adhered than the flat structure. This is because the spray material, sprayed onto the tapered part 6, is (i) less likely to leak out of the tapered part 6 and (ii) therefore more likely to adhere to the tapered part 6.

(2) Tensile Strength of Electric Wire

According to the comparison between the V-shaped structure and the flat structure, the V-shaped structure exhibited approximately 2.1 times greater tensile strength of an electric wire than the flat structure. This is because, in the V-shaped structure, (i) the spray material easily accumulates on the tapered part 6, so that an area of contact between the spray material and the electric wire 10 is increased and (ii) the electric wire 10 and the tapered part 6 are therefore tightly joined together.

Note that the above results of (1) and (2) are brought by cold spraying in which the spray material used was mixed powder of tin and zinc. However, also in a case where the spray material used was a different spray material, similar results are brought about due to a structural difference between the V-shaped structure and the flat structure.

Further, the V-shaped structure is more advantageous than the flat structure when compared in terms of the viewpoints (1) and (2). It should be noted, however, that the flat structure itself is also encompassed in an embodiment of the present invention.

Joining Electric Wire and Terminal by Thermal Spraying

The following advantages are brought about by joining an electric wire and a terminal by a thermal spray method.

As described above, the caulking has been widely known as a technique for joining an electric wire and a terminal. Since the caulking is performed manually, one joint at a time, a burden on an operator increases as the number of joints of an electric wire and a terminal to be made increases. In contrast, in a case of joining an electric wire and a terminal by a thermal spray method, a thermal spraying device (e.g., the cold spray device 100) can be used. In a case where a large number of electric wires need to be joined, the electric wires and the terminal can be joined all together (batch process). That is, in the case where a large number of electric wires need to be joined, a reduction in burden on an operator is significant.

When taking the terminal 1 for instance, a single joining part 20 can be provided for all of the insertion holes 7a through 7f in a case where the insertion holes 7a through 7f, formed in the terminal main body 3, are arranged at short intervals. In a case where the insertion holes 7a through 7f in the terminal main body 3 are arranged at long intervals, a plurality of joining parts are provided for the respective insertion holes 7a through 7f so as to reduce an amount of the spray material to be used. Thus, in a case of joining of an electric wire and a terminal by thermal spraying, it is possible to carry out flexible spraying in accordance with a structure of the terminal.

Further, a terminal in accordance with an embodiment of the present invention has electrical conductivity. This causes the electric wire 10 and an external wire to be electrically connected to each other via a spray material. The spray material may be a metal, a ceramic, a composite material (cermet) of a metal and a ceramic, or a resin each of which has electrical conductivity. In a case where a ceramic is employed as the spray material, the joining part 20 improves in durability. In a case where a resin is employed as the spray material, the joining part 20 can realize its weight saving. By thus changing the spray material, it is possible to enjoy advantages of respective spray materials.

Note that the joining part 20 can be formed by a method other than the thermal spraying. The joining part 20 can be formed by soldering. Alternatively, the joining part 20 can be formed with use of electrically conducive paste.

Aspects of the present invention can also be expressed as follows:

An electric wire joining structure in accordance with Aspect 1 of the present invention is an electric wire joining structure, including: one or more electric wires; a terminal including one or more insertion holes for the respective one or more electric wires, the one or more electric wires being inserted into the respective insertion holes; and a joining part formed by thermal spraying, the joining part joining the one or more electric wires to the terminal on a side on which the one or more electric wires have passed through the respective one or more insertion holes.

Caulking has been widely known as a technique for joining an electric wire and a terminal. Caulking requires manual operation. As such, in a case where caulking is adopted, a burden on an operator increases as the number of electric wires to be joined increases.

In contrast, with the above configuration, the one or more electric wires are joined to the terminal by the joining part as a result of thermal spraying. Thermal spraying may be carried out with use of a conventional thermal spraying device. As such, with the above configuration, it is possible to reduce a burden on an operator. This effect is exhibited to a greater extent as the number of electric wires to be joined increases.

In Aspect 2 of the present invention, the electric wire joining structure in accordance with Aspect 1 above may be configured such that: the terminal has a tapered part on the side of the terminal on which side the one or more electric wires have passed through the respective one or more insertion holes; the tapered part has the one or more insertion holes; and the joining part joins the one or more electric wires to the terminal in the tapered part.

With the above configuration, it is possible to increase a tensile strength of the one or more electric wires.

In Aspect 3 of the present invention, the electric wire joining structure in accordance with Aspect 1 or 2 above may be configured such that: each of the one or more electric wires is a covered wire; and the joining part joins an uncovered portion of a tip part of the each of the one or more electric wires to the terminal.

With the above configuration, it is possible to electrically connect the one or more electric wires to the terminal even in a case where each of the one or more electric wires is a covered wire.

In Aspect 4 of the present invention, the electric wire joining structure in accordance with any one of Aspects 1 through 3 above may be configured such that the joining part is a film formed by cold spraying.

With the above configuration, it is possible to both (i) reduce oxidization of the film and (ii) control the film to have a high density, as compared with other thermal spray methods (arc spraying, plasma spraying, or the like).

An electric wire joining method in accordance with Aspect 5 of the present invention is an electric wire joining method, including the steps of: (a) inserting, into one or more insertion holes formed in a terminal, respective one or more electric wires; and (b) joining, by thermal spraying, the one or more electric wires to the terminal on a side on which the one or more electric wires have passed through the respective one or more insertion holes.

According to the configuration, an effect similar to that of the electric wire joining structure is brought about.

In Aspect 6 of the present invention, the electric wire joining method in accordance with Aspect 5 above may be configured such that: the terminal has a tapered part on the side on which the one or more electric wires have passed through the respective one or more insertion holes; and the one or more insertion holes are formed in the tapered part.

With the configuration, an effect similar to that of the electric wire joining structure is brought about.

In Aspect 7 of the present invention, the electric wire joining method in accordance with Aspect 5 or 6 above may be configured such that in the step (b), the one or more electric wires are joined to the terminal by cold spraying.

With the configuration, an effect similar to that of the electric wire joining structure is brought about.

In Aspect 8 of the present invention, the electric wire joining method in accordance with Aspect 7 above may be configured such that in a case where (i) the one or more insertion holes are a plurality of insertion holes and (ii) the one or more electric wires are a plurality of electric wires, in the step (b) the plurality of electric wires are joined to the terminal all together.

With the above configuration, it is possible to further reduce a burden required in joining the one or more electric wires to the terminal.

A terminal in accordance with Aspect 9 of the present invention is a terminal to be joined to one or more electric wires, including: a terminal main body having one or more insertion holes into which the respective one or more electric wires are to be inserted, the terminal main body including a tapered part, the one or more insertion holes being formed in the tapered part.

With the configuration, an effect similar to that of the electric wire joining structure is brought about.

The terminal in accordance with Aspect 9 of the present invention is configured such that the terminal further includes: an electric wire provision section connected to the terminal main body, the electric wire provision section including one or more grooves in which the respective one or more electric wires are to be provided.

With the configuration, the one or more electric wires are provided stably on the electric wire provision section. This allows stabilizing the position of each of the one or more electric wires in occasions such as when the one or more electric wires are subjected to thermal spraying or when the above electric wire joining structure is used.

The present invention is not limited to the embodiments, but can be altered by a skilled person in the art within the scope of the claims. The present invention also encompasses, in its technical scope, any embodiment derived by combining technical means disclosed in differing embodiments.

Reference Signs List 1, 30, 40, 50: terminal
2, 32: electric wire provision section
3, 33, 43, 53: terminal main body
4, 34: external electric wire attachment section
6, 46, 57: tapered part
7, 7a, 7f, 37a, 37f: insertion hole
10, 10a, 10f: electric wire
20: joining part
20a: spray material
80, 90: electric wire joining structure
100: cold spray device
110: tank
120: heater
140: feeder
150: base material holder
160: spray nozzle
170: base material

The invention claimed is:

1. A terminal to be joined to one or more electric wires, comprising:
   a terminal main body having one or more insertion holes into which the respective one or more electric wires are to be inserted,
      the terminal main body including a tapered part,
      the one or more insertion holes being formed in the tapered part,
      the tapered part having a V-shaped structure; and
   an electric wire provision section connected to the terminal main body,
      the electric wire provision section including one or more grooves in
      which the respective one or more electric wires are to be provided; and
   an external electric wire attachment section which electrically connects the terminal main body and an external electric wire.

2. An electric wire joining structure, comprising:
   a plurality of electric wires:
   a terminal including a plurality of insertion holes for the respective plurality of electric wires, each of the plurality of insertion holes passing through the terminal throughout the entire terminal and the plurality of electric wires being inserted into the respective plurality of insertion holes;
   a joining part, the joining part joining the plurality of electric wires to the terminal on a side on which the plurality of electric wires have passed through the respective plurality of insertion holes, the plurality of electric wires each having a tip part embedded in the joining part; and
   an electric wire provision section having a plurality of wire retaining compartments formed therein, wherein the terminal has a main body and a tapered part formed in the main body, the electric wire provision section being connected to the tapered part downstream of the main body in the wire insertion direction.

3. The electric wire joining structure as set forth in 2, wherein:
   the terminal has a tapered part on the side of the terminal on which side the plurality of electric wires have passed through the respective plurality of insertion holes;
   the tapered part has the plurality of insertion holes; and
   the joining part joins the plurality of electric wires to the terminal in the tapered part.

4. The electric wire joining structure as set forth in claim 3, wherein the tapered part has a V-shaped structure.

5. The electric wire joining structure as set forth in 2, wherein:
   each of the plurality of electric wires is a covered wire; and
   the joining part joins an uncovered portion of the tip part of the each of the plurality of electric wires to the terminal.

6. The electric wire joining structure as set forth in claim 2, wherein the joining part is a film formed by cold spraying.

7. The electric wire joining structure as set forth in claim 2, wherein the plurality of insertion holes pass through an apex of a V-shaped groove.

\* \* \* \* \*